June 10, 1924.
P. THOMAS
1,497,415
MOLDED OIL FILLED CONDENSER
Filed April 21, 1921
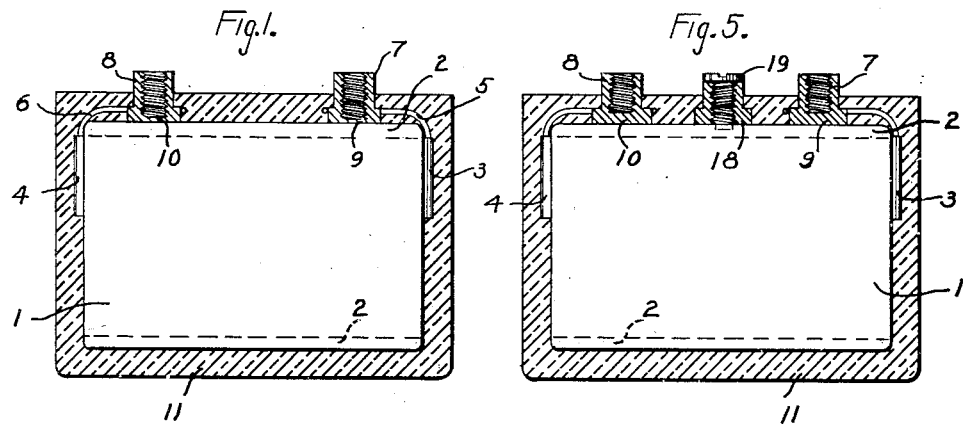
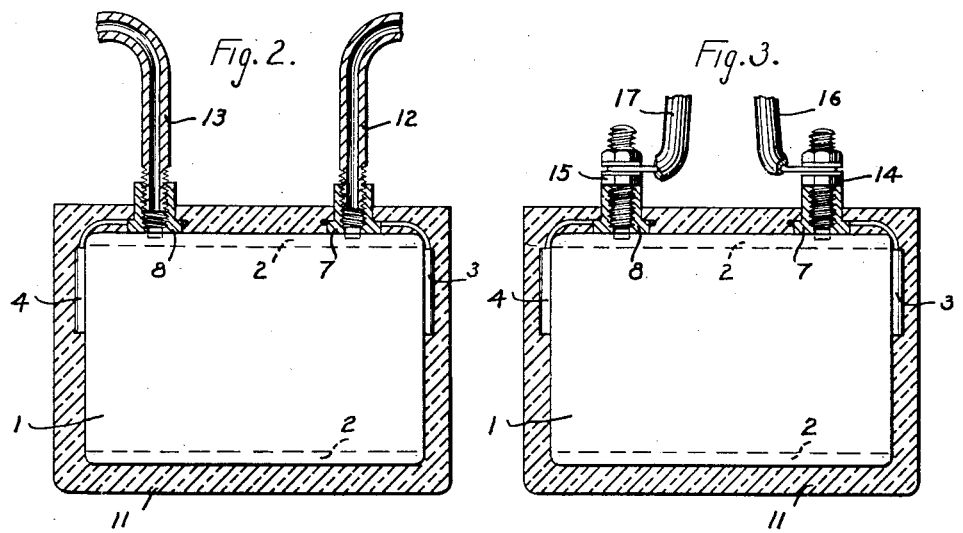
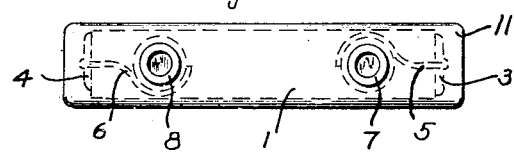
WITNESSES:
John W. Whiting
H. C. Bierman
INVENTOR
Phillips Thomas.
BY
Wesley F. Carr
ATTORNEY Patented June 10, 1924.

1,497,415

UNITED STATES PATENT OFFICE.

PHILLIPS THOMAS, OF EDGEWOOD PARK, PENNSYLVANIA, ASSIGNOR TO WESTINGHOUSE ELECTRIC & MANUFACTURING COMPANY, A CORPORATION OF PENNSYLVANIA.

MOLDED OIL-FILLED CONDENSER.

Application filed April 21, 1921. Serial No. 463,297.

*To all whom it may concern:*

Be it known that I, PHILLIPS THOMAS, a citizen of the United States, and a resident of Edgewood Park, in the county of Allegheny and State of Pennsylvania, have invented a new and useful Improvement in Molded Oil-Filled Condensers, of which the following is a specification.

This invention relates to condensers, more particularly to condensers of the molded type.

Hitherto, condensers having molded covers or cases have been made from alternate sheets of metal foil and paper impregnated with a solid dielectric, such as wax. The ends of the metal foil were soldered together and to terminals which were connected to insert members. The assembly thus formed was then placed in a mold between sheets of a suitable molding composition, generally including a phenolic condensation product and filler material, and placed in a hydraulic press where the material was subjected to heat and pressure for a short period of time, about one minute. This consolidated the structure and hardened the outer layers of the molding mixture.

It was practically impossible to so perform the molding operation as to harden the entire cover or case, since the heat would penetrate to the condenser body and melt the wax dielectric, changing the capacity of the condenser. Great care was necessary during the moulding operation to prevent such penetration of heat and, generally, it was necessary to remove the condenser from the heated press and immediately cool the same in a suitable cooling device, generally under pressure.

However, condensers of this type are very desirable in that they are compact and simple to manufacture, and are comparatively inexpensive. Practically no clamping means other than the rigidity of the molded cover are necessary to hold the condenser body in proper alinement.

The present invention is designed to provide a condenser of the molded type embodying the desirable characteristics of such condensers and avoiding the disadvantages and defects thereof, it being among the objects of this invention to devise a method of forming condensers of the molded type in which the cover or case is substantially uniformly hardened throughout its thickness.

It is a further object of this invention to provide a condenser structure which is more efficient than the prior type of condenser embodying a solid dielectric.

In practising my invention, I provide a condenser body of any suitable type, generally stacked, and solder or weld the ends of the metal foil together and to suitable terminals secured to insert members. The condenser body thus formed, but not impregnated with a dielectric, is preferably dried in a suitable drying oven, and a cover or case molded thereon.

This is accomplished in the usual manner by placing the assembled structure between sheets of a molding composition in a press and applying heat and pressure thereto, generally for a period of time short enough to prevent complete hardening of the molding mixture but sufficient to cause hardening of the outer layers so that the condenser structure is self-sustaining.

Openings are then formed in the insert members, heat and vacuum are applied for a predetermined length of time and the body then impregnated with a molten or a liquid dielectric, such as an insulating oil. The openings in the insert members are then sealed.

In the accompanying drawings forming a part hereof and which illustrate several embodiments of my invention, Fig. 1 is a vertical cross-sectional view of a condenser made in accordance with my invention in a preliminary stage of manufacture;

Fig. 2 is a view similar to that of Fig. 1 showing the condenser in an intermediate stage;

Fig. 3 a similar view of a completed condenser;

Fig. 4 a plan view thereof, and

Fig. 5 is a vertical sectional view of a slightly modified form of condenser.

In practising my invention, I provide a condenser body 1 of suitable type but preferably consisting of stacked layers of alternate sheets of metal foil and solid dielectric, such as paper, the longitudinal edges 2 of the paper extending a considerable distance beyond the longitudinal edges of the metal foil. In a condenser structure in which the width of the strips of sheet material used is about six inches, this space is about one-half inch. The ends 3 and 4 of the sheets of metal foil are soldered or welded together and to leads 5 and 6, respectively, secured to hollow insert members 7 and 8, respectively, the interiors of which are threaded and the lower ends 9 and 10, respectively, closed.

The assembled structure is placed in a mold with sheets of a molding mixture comprising a phenolic condensation product and a filler, such as wood flour, and is subjected to heat and pressure for a short period of time forming a cover 11 on the condenser body. The lower portions 9 and 10 of insert members 7 and 8 are then drilled out, the openings thus formed extending a short distance into the edges 2 of the paper of the condenser. Tubes 12 and 13, preferably threaded at their lower ends, are screwed into the openings of inserts 7 and 8, respectively.

The entire structure is then placed in a suitable holder or clamp where it is subjected to a temperature over 100° C., usually about 110° C., for about 18 hours in a vacuum. This procedure thoroughly dries the condenser body and vaporizes the moisture therein, at the same time completing the hardening of the case 11 of the condenser body. Insulating oil is then passed in through tubes 12 and 13, while still maintaining heat and vacuum, until the structure is thoroughly impregnated, after which the tubes are removed, and threaded plugs 14 and 15 are screwed into inserts 7 and 8 to form oil-tight joints. Conductor members 16 and 17 are then connected to the terminals 14 and 15 so formed.

In order to facilitate the operation and increase the efficiency of the condenser formed in the manner above set forth, I generally prefer to pre-dry the condenser body before the cover is molded thereon. This may be accomplished in any desired manner but generally I perform this operation by placing the assembled condenser body in a drying oven at a temperature of about 110° C. for four to six hours.

It is apparent that the structure above described constitutes but one of the many forms in which my invention may be embodied. For instance, in the disclosure of Fig. 5, I have provided the insert members 7 and 8 with permanently closed lower ends 9 and 10, respectively, and for the purpose of impregnation, I provide one or more additional insert members 18. These may be formed either with a closed lower end which is subsequently opened or with an open end which is sealed by a plug member 19, the plug being removed during the impregnation of the condenser.

It will be seen that a condenser formed in accordance with the present invention is simple in construction, the steps of the process utilized in forming the same are few and close control of the conditions of manufacture is unnecessary. The molding operation may be carried on within wide limits of time and temperature, it being necessary to give the case a partial hardening sufficient only to enable the condenser to be self-sustaining for manipulation in the later steps. The complete curing is performed incidentally during the drying and impregnation of the condenser body in heat and vacuum.

I have found that, although the openings through which the impregnation takes place are comparatively small, the drying and impregnation are uniform and complete.

Condensers made in accordance with this invention and having a capacity of .6 microfarads have been found to have a power factor of .4% at 500 cycles and .5% at 60 cycles. A condenser of the molded type utilizing a solid dielectric, such as montan wax, and having a capacity of .4 microfarads, has a power factor of 1% or more. It will be seen, therefore, that not only have I provided a simpler method of forming condensers, but one of the results of my new method is a condenser of increased efficiency. Having the inserts solid during the molding makes it unnecessary to impregnate the condenser directly after molding, since the mass is air-tight and cannot reabsorb water which was driven off during the drying of the condenser body.

It will be apparent from the above description that various changes in details of construction of the condenser and steps of the process may be made within the scope of this invention. For instance, tubes 12 and 13 need not be threaded but may be merely inserted into inserts 7 and 8 extending into the paper of the condenser body. These and other changes may be made in my invention without departing from the principles above set forth.

I claim as my invention:

1. A condenser comprising sheets of foil and solid dielectric impregnated with a liquid dielectric and a molded cover thereon.

2. A condenser comprising sheets of foil and a solid dielectric impregnated with an insulating oil and a molded cover thereon.

3. A condenser comprising sheets of foil and solid dielectric impregnated with a liquid dielectric and a molded cover including a condensation product thereon.

4. A condenser comprising sheets of foil and solid dielectric impregnated with a liquid dielectric, a molded cover thereon and an insert molded in said cover.

5. A method of forming condensers which comprises forming a condenser body, molding a cover thereon, and impregnating said body with a dielectric.

6. A method of forming condensers which comprises forming a condenser body, molding a cover thereon and impregnating said body with an insulating oil.

7. A method of forming condensers which comprises forming a condenser body, molding a cover thereon and impregnating said body with an insulating oil with the aid of heat and vacuum.

8. A method of forming condensers which comprises forming a condenser body, drying the same, molding a cover thereon and impregnating said body with a dielectric.

9. A method of forming condensers which comprises forming a condenser body, drying the same, molding a cover thereon and impregnating said body with a dielectric with the aid of heat and vacuum.

10. A method of forming condensers which comprises forming a condenser body, drying the same, molding a cover thereon and impregnating said body with a dielectric at a temperature over 100° C.

11. A method of forming condensers which comprises forming a condenser body, drying the same, molding a cover thereon and impregnating said body with a dielectric at a temperature over 100° C. in a vacuum.

12. A method of forming condensers which comprises forming a condenser body, securing metal inserts to the terminals thereof, molding a cover thereon, said inserts being molded into said cover and impregnating said body with a dielectric through said inserts.

13. A method of forming condensers which comprises forming a condenser body, securing metal inserts to the terminals thereof, molding a cover thereon, said inserts being molded into said cover and impregnating said body with a dielectric through said inserts with the aid of heat and vacuum.

14. A method of forming condensers which comprises forming a condenser body, securing metal inserts to the terminals thereof, molding a cover thereon, said inserts being molded into said cover, forming openings in said inserts, and impregnating said body with a dielectric through said inserts with the aid of heat and vacuum.

15. A method of forming condensers which comprises forming a condenser body, securing metal inserts to the terminals thereof, molding a cover thereon, said inserts being molded into said cover, forming openings in said inserts, and impregnating said body with a dielectric through said insert with the aid of heat and vacuum, and sealing the openings in said inserts.

16. A method of forming condensers which comprises forming a condenser body, molding a cover thereon, an insert being molded in said cover, forming an opening in said insert and impregnating said body with a dielectric.

17. A method of forming condensers which comprises forming a condenser body, molding a cover thereon, an insert being molded in said cover, forming an opening in said insert and impregnating said body with a dielectric and sealing the opening in said insert.

In testimony whereof, I have hereunto subscribed my name this 11th day of April, 1921.

PHILLIPS THOMAS.